July 23, 1935.  H. KRUSE  2,008,831
METHOD AND APPARATUS FOR NAILING FLANGES
Filed Aug. 30, 1930   6 Sheets-Sheet 1

Inventor:
Hermann Kruse
By Bilinger, atty.

July 23, 1935.  H. KRUSE  2,008,831
METHOD AND APPARATUS FOR NAILING FLANGES
Filed Aug. 30, 1930   6 Sheets-Sheet 2
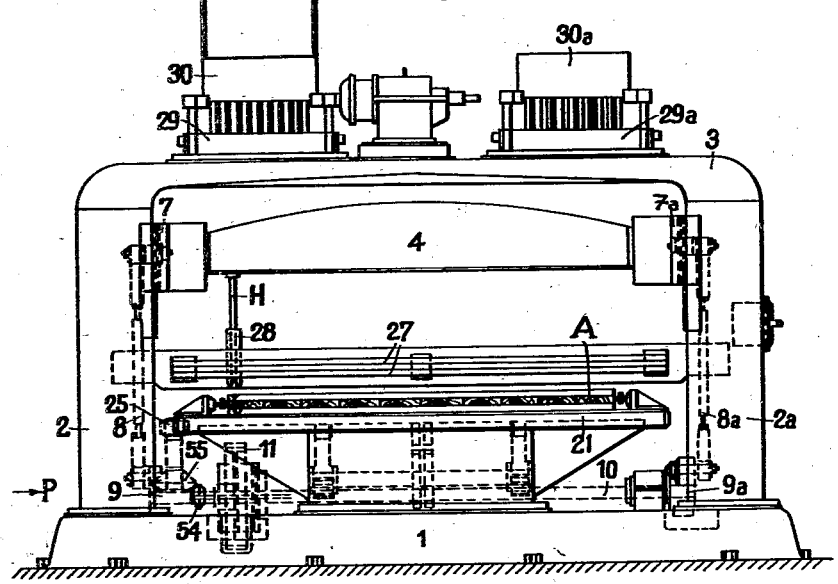
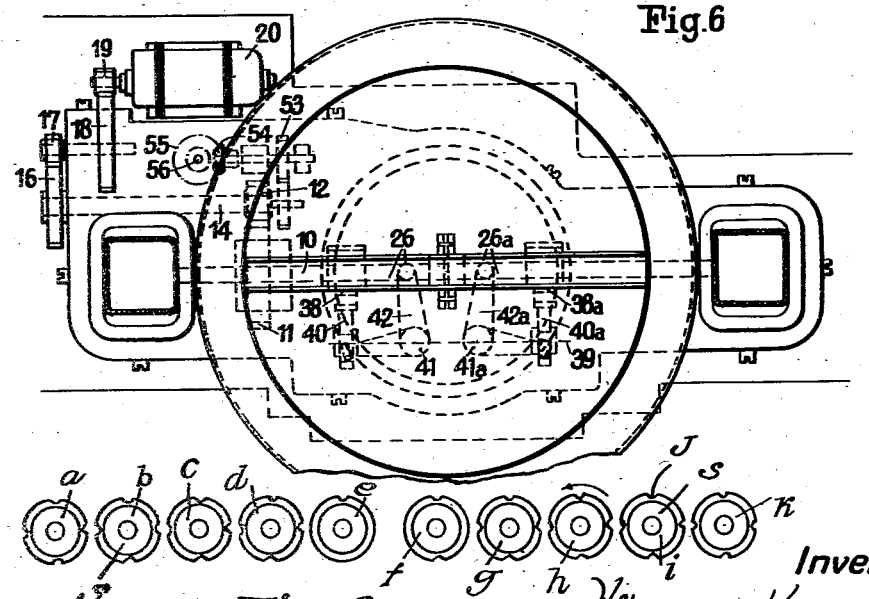

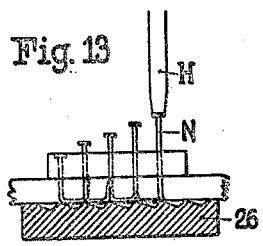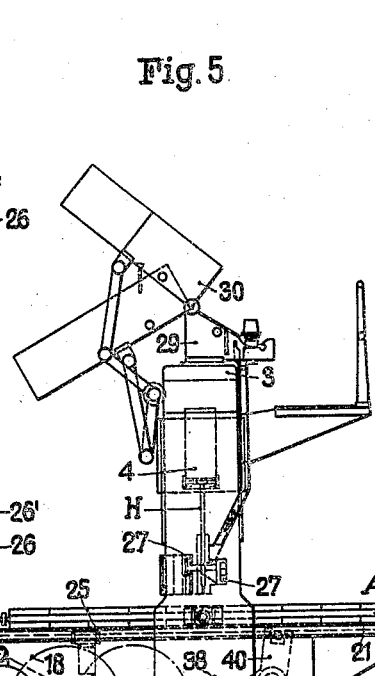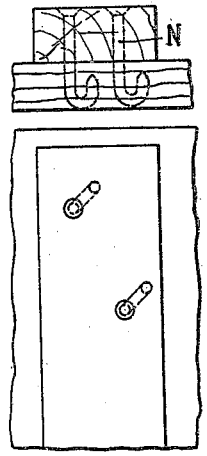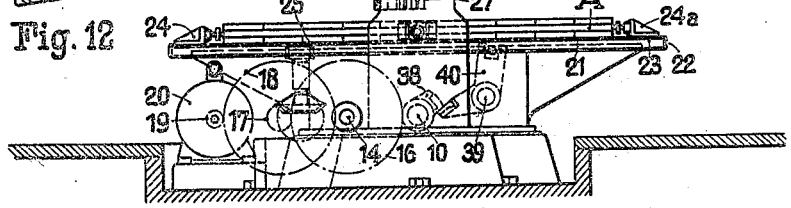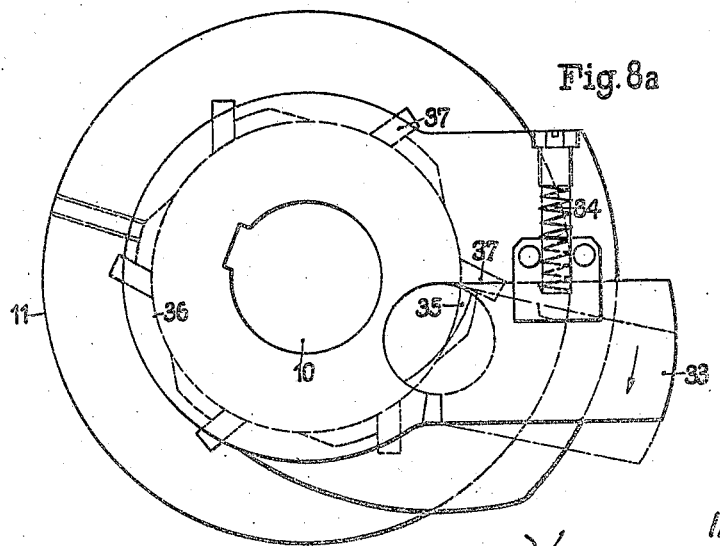

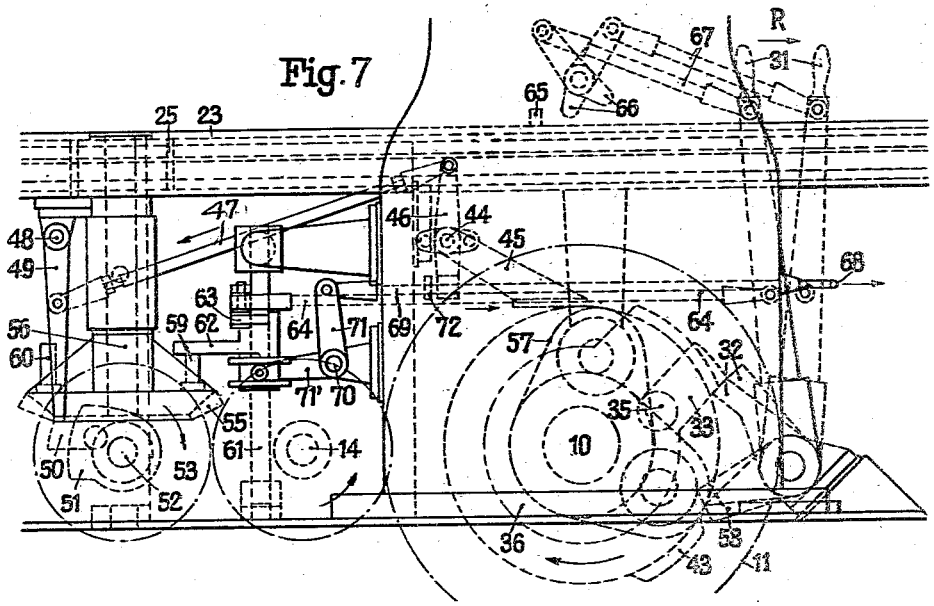
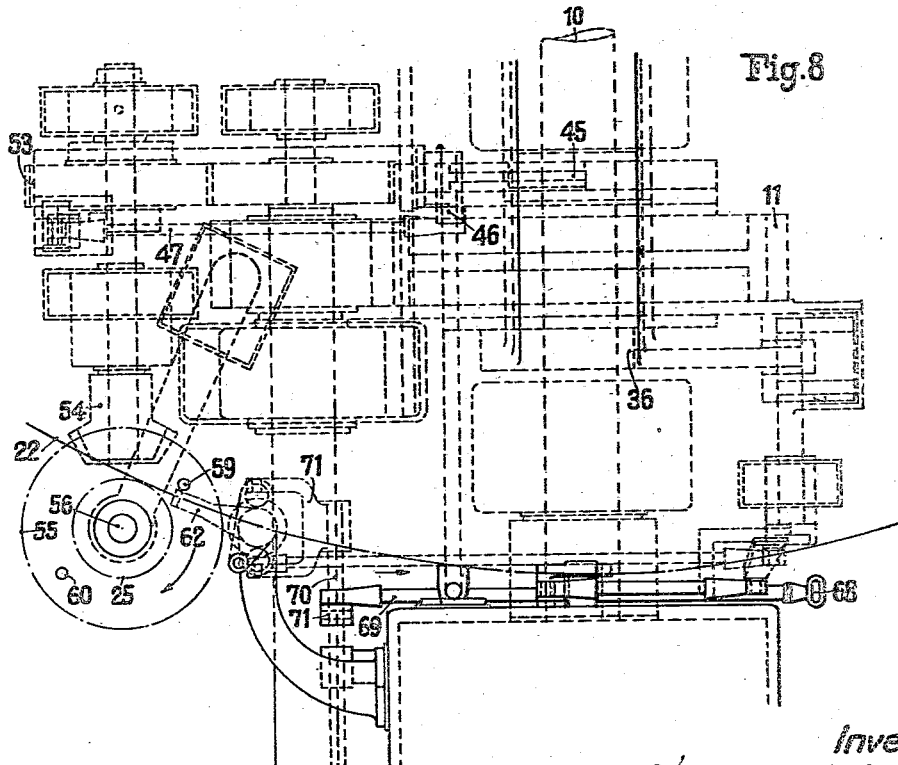

July 23, 1935. H. KRUSE 2,008,831
METHOD AND APPARATUS FOR NAILING FLANGES
Filed Aug. 30, 1930 6 Sheets-Sheet 5

Inventor:
Hermann Kruse
By Bilinger, Atty

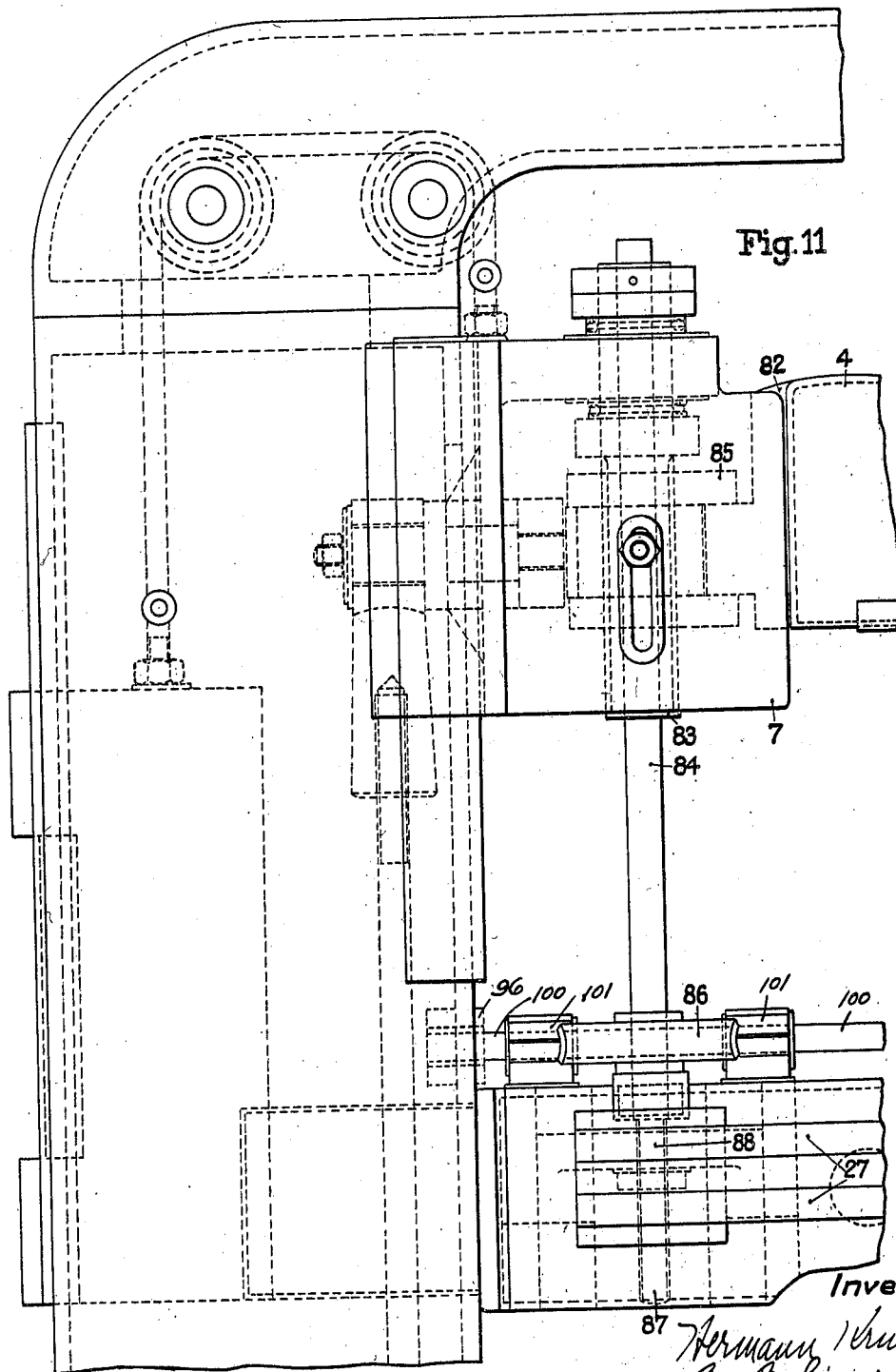

Patented July 23, 1935

2,008,831

UNITED STATES PATENT OFFICE 2,008,831

METHOD AND APPARATUS FOR NAILING FLANGES

Hermann Kruse, Bremen-Sebaldsbruck, Germany

Application August 30, 1930, Serial No. 478,980
In Germany March 22, 1930

12 Claims. (Cl. 1—1)

The machine nailing of large wooden discs of large diameter which are built up of several layers, for example the flanges of cable drums, has hitherto been found impracticable owing to the large diameter, ranging up to 3¼ m., and thickness of such discs ranging up to 150 mm., the length and thickness of the nails required, which in the example quoted are 210 mm. in length and 17 mm. in diameter, and the amount of force required to drive them, particularly when it is desired, as indeed is necessary, that the nails shall be bent over hook-wise, so that they reenter the wood, further the size and weight of the wooden discs themselves being an additional source of difficulty.

The present invention has for its object a method and apparatus whereby this work can be carried out automatically, dispensing with the lengthy and difficult manual labour otherwise involved.

The essence of the new method consists in the use of nail-feed and nail-driving appliances, of known form, the laminated wooden plate being rotated step by step under a driver, which on each downstroke drives the required nails into two diametrically opposite sections, after which the driver is lifted, the disc rotated through an angle equal in extent to one section and the same operation repeated.

A feature of the method according to this invention is that on each downstroke of the driver only one-half of the total number of nails required is driven into the two diametrically opposite sections viz. on one side of the one section a certain group of such nails, and another group on the opposite or complementary side of the opposite sector, the result being that after one complete revolution of the disc each sector will have had one set of nails driven into it from the one side, say the left side of the driver, and a second and final set from the other side, the right side of the driver.

This method of working offers the special advantage that each stroke of the driver serves to drive only about one half of the total number of nails provided for every two opposite sections, so that the pressure exerted by the driver is only half the pressure that would be required to drive all the nails into the two sections simultaneously.

This method of simultaneously nailing two opposite sections has the further advantage that the axial forces involved with the usual type of riveting driver, which effects the forcing through and bending over, are mutually compensated.

In order that the invention may be the better understood drawings are appended in which:—

Fig. 1 shows a plan of the flange A of a cable drum, with nails N uniformly distributed in concentric circles B, C, D, E, F, and G. The disc has also been shown divided into forty separate sections, numbered 1 to 40 round the periphery of the disc, in such manner that sector 40 is diametrically opposite to sector 20, sector 39 opposite to 19, sector 1 opposite to 21, and so on.

Fig. 2 shows in the plan view sectors every two of which lying opposite to each other, for instance 1 and 21, 2 and 22, 3 and 23, 4 and 24, 5 and 25 with the nails, which in every two opposite lying sectors are simultaneously driven into the step by step rotated disc to be nailed by means of a driver moved up and down.

It is to be seen from Fig. 2 that in the sector 1, represented by black dots, five nails are driven in at the downstroke of the driver and in the opposite lying sector 21, represented by black dots, also five nails, sector 2 four nails and in the opposite lying sector 22 four nails, in sector 3 four nails and in the opposite lying sector 23 five nails, in sector 4 four nails and in the opposite lying sector four nails. The same procedure repeats itself in sector 5 or 25 respectively, and so on.

With every four strokes of the driver 35 nails are driven in, thus after a complete rotation of the wooden disc 350 nails will have been driven.

The complete nailing of a sector with the revolution of the wooden disc to be nailed by 360° takes place in two phases which are apart 180° so that with one complete revolution by 360° of the disc to be nailed all the nails are driven into this disc.

Fig. 3 shows how the group feeding of the nails to two sections, lying diametrically opposite to each other, of the laminated wooden disc is effected according to Fig. 3 by revolving picker rollers S provided with grooves J for the nails. There are ten of such revolving picker rollers adjacent to each other, of which the revolving picker rollers a to e on the left effect the feeding of the nails to a sector and the revolving picker rollers f to k on the right effect the feeding of the nails to the opposite lying sector.

It results from the arrangement of the grooves in the revolving picker rollers a to k that with four strokes of the driver which correspond to one complete revolution of the revolving picker rollers, a total of 35 nails are driven in corresponding to the number of the shown grooves in the ten revolving picker rollers.

A machine for carrying out the method just described is illustrated in Figs. 4 to 15.

Fig. 4 is a side view.

Fig. 5 is an end view, and

Fig. 6 is a ground plan of the whole machine assembly with the step-by-step controlled turntable for the laminated wooden disc that is to be nailed, also the periodically reciprocating driver with the nail-feed members and the so-called riveting beam.

Fig. 7 is an enlarged end view looking in the direction of the arrow P in Fig. 4.

Fig. 8 is a plan, and

Fig. 8a shows a detail of the controlling mechanism which insures the step by step rotation of the ring yoke holding the disc to be nailed, as well as the periodic, reciprocal movement of the driver.

Figure 10:
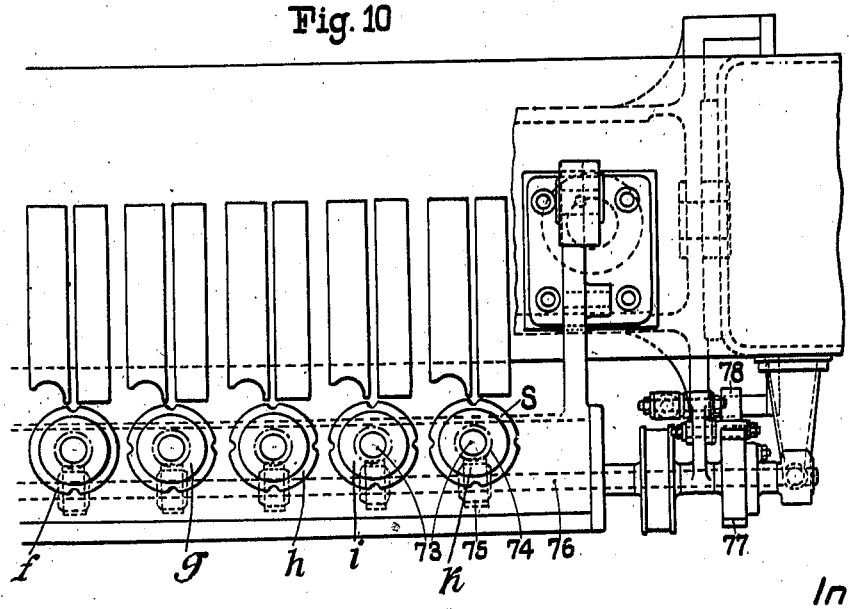

Fig. 10 an enlarged plan taken from the driver of the step by step drive of the nail pickers.

Fig. 11 shows an enlarged side-view of the drive and means for the adjustment of the height of the driver.

Figs. 12 to 15 show in plan and in elevation the grooved riveting plate designed to insure that the nail points are bent over hook-wise as the drivers drive them in.

Figure 16:
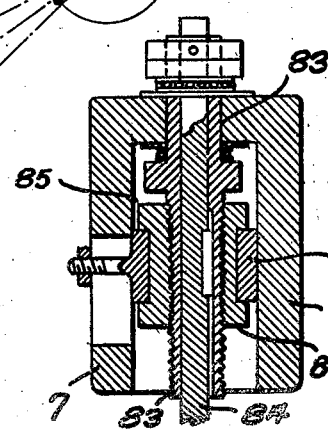
Figure 9:
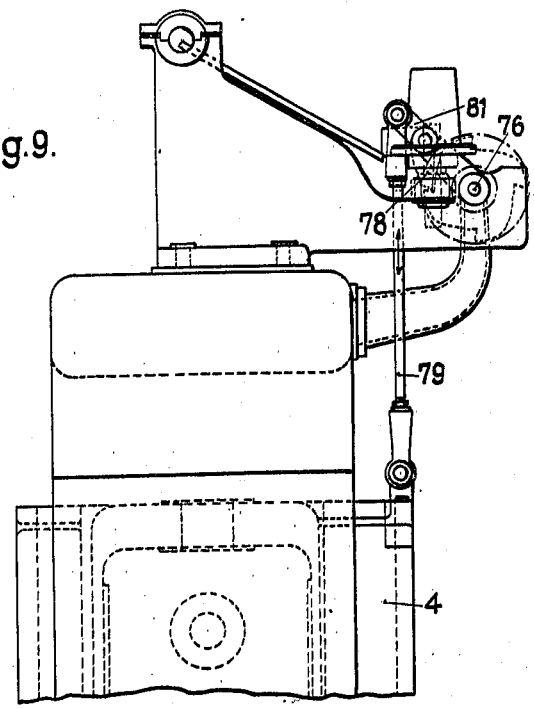
Fig. 9 is an enlarged end view.

Fig. 16 is a detail vertical sectional view through the center of the shaft 84 in Fig. 11.

The machine, as shown in Figs. 4 to 6, consists of a baseplate 1, on which is supported a frame in the form of two lateral uprights 2 and 2a, connected at their upper ends by the transverse member 3. 4 indicates a beam, the ends of which run in guides disposed lengthwise of the lateral supports, and to which beam a vertical reciprocating movement is imparted. The beam is provided with a number of plungers or drivers such as H, only one of which is shown in the drawings, the arrangement being that usually employed in ordinary nailing machines. The reciprocating movement of the beam 4 is effected by means of connecting rods 8 and 8a, connected at one end to screws on the beam slippers 7 and 7a, and at the other end to cranks 9 and 9a on the main shaft 10, which is rotated step by step. The main shaft 10 is provided with a pinion 11, Figs. 4 and 6, and said pinion is operated by a controllable coupling, hereinafter described. 14 indicates a second shaft provided with a pinion 12, said pinion engaging with pinion 11. The shaft 14 is driven through countershafts by pinions 16, 17, 18 and pinion 19 of an electric motor 20.

Mounted upon the base plate 1 is a horizontally disposed table 21. A V-shaped slot formed in the edge of this table accommodates a ring 23 provided externally with gear teeth 22, the table 23 carrying adjustable clamps or grippers 24 and 24a, see Fig. 5, which serve to clamp the laminated wooden disc A firmly in position. A step by step rotation of the toothed ring 23 on the table 21 is effected by means of a pinion 25, Figs. 4 and 5 engaging the teeth of the ring, in a manner to be hereafter described. Also carried by the table 21 and disposed in the same vertical plane as the beam 4 are riveting plates 26 and 26a, which have a reciprocating movement in opposite directions. The effective surfaces of these plates as shown for example in Figs. 12 and 13, are provided with diagonally disposed grooves 26', with which the points of nails N come into contact under the impulse of the descending driver H. The points, in consequence of the lateral motion of one of the riveting plates are bent over hook-shaped at an angle to the grain of the wood, as shown in Figs. 14 and 15.

Above the table 21 that carries the disc A, which is to be nailed, is a crossbeam 27 carried on supports that allow it to be set at various heights. This serves to carry the driver sockets 28, to which the nails are fed in the manner usual with nailing machines. The drivers H on the driver beam penetrate into the sockets as the beam descends and in doing so drive the nails into the wood. The upper cross beam 3 of the machine frame carries superstructures 29 and 29a with the nailboxes 30 and 30a, from which the nails are fed to the hammer sockets.

The operation of the machine is as follows:—

Figure 1:
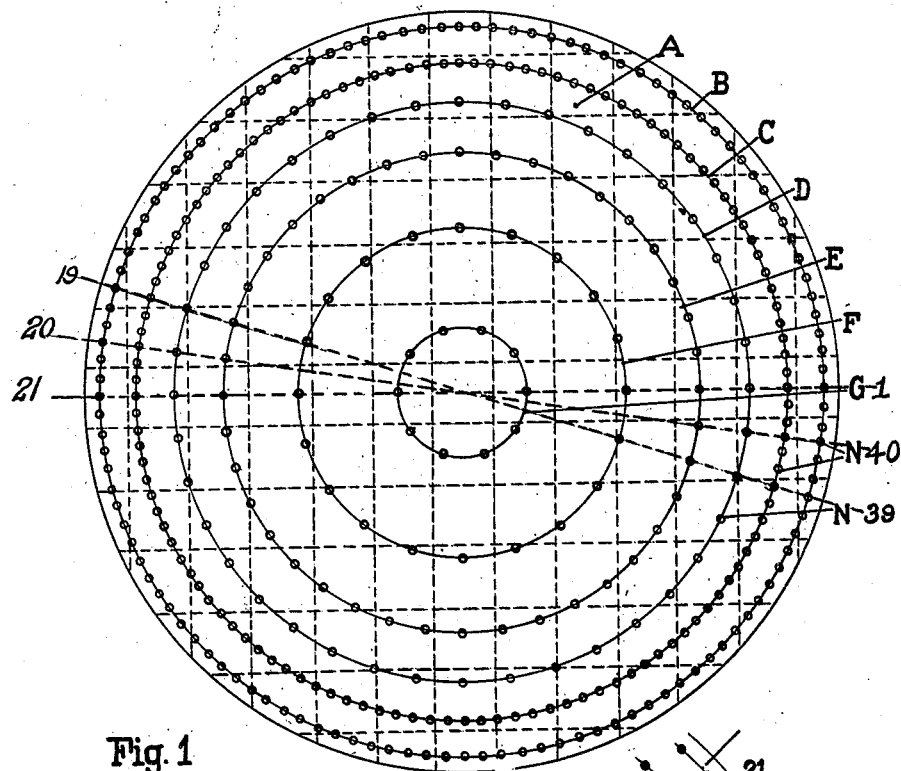
Figure 2:
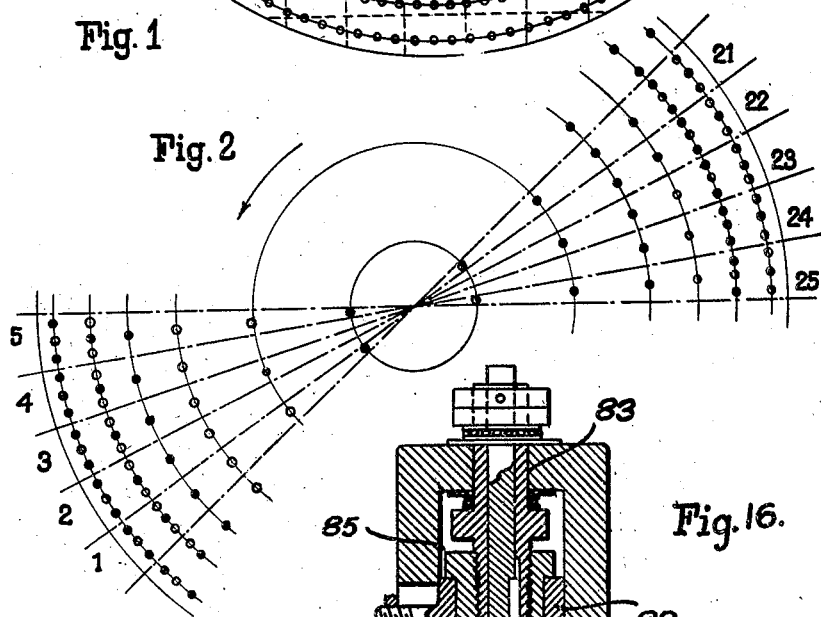

The boards required to make up the flange, superposed crosswise in three layers, are secured in position in the ring 23 on table 21 by means of clamps 24 and 24a. Movement of a hand lever 31, hereafter more fully described causes gear wheel 11 to be clutched to shaft 10, thereby causing the driver beam 4 to move downwards. In the example shown in Figs. 1 to 3, this first stroke drives in ten nails, the points of which are bent and pushed right back into the wood by the action of the riveting plates 26 and 26a, which, as previously explained with reference to Figs. 13 and 14, are grooved in a manner such that they are in section like ratchet teeth. The extraordinarily strong pressure exerted by the heavy nails is nullified by reason of the fact that the riveting plates move in opposite directions to each other, so that there are no unilateral stresses upon either the machine frame or the working parts. When the driver beam rises again, the rotating nail pickers S, which will hereafter be more fully described, automatically carry a fresh supply of nails to the hammer sockets on the crossbeam 27, see Fig. 4, the number thus supplied on the second beat of the driver-beam in the present example being eight. Without any further interference by hand, the engaging mechanism more fully described below causes the second set of nails to be driven after the ring 22 has effected the necessary partial turn, and so on until after the fortieth stroke the disc is fully nailed together, having meanwhile turned through an angle of 360°, i. e. returned to its original position. The driving mechanism is then automatically disengaged; the machine stops and the finished piece of work can be removed and a fresh one put in.

The driving and control mechanism, to which reference has previously been made, are shown in Figs. 7, 8 and 8a, the said mechanism which governs the intermittent movement of the ring 23, the vertical reciprocation of the driver-beam, and the horizontal reciprocal movement of the riveting plates referred to being shown in the positions they occupy while the machine is at rest.

When the hand lever 31 is moved in the direction of arrow R shown in Figure 7,—in order to set the machine in motion—the pawl 32 mounted on the lever is pulled out of the path of a rotating control cam 33. This cam 33 as shown in Fig. 8a, is under the action of a spiral pressure spring 34, under the action of which when released through the removal of pawl 32, it is caused to move in the direction of the arrow marked thereon in the drawings. 35 indicates a cylindrical body or pin disposed in a circular recess formed on clutch sleeve 36, which is keyed on to the main shaft 10 of the machine, said body or pin 35 being secured to the cam 33. When cam 33 is in the stopped position as shown by the full lines in Fig. 8a, dog 35, which is provided with a cam face as shown, is sunk in the recess of the clutch sleeve 36. In the starting position the cam is in the position indicated by the dotted lines in Fig. 8a, a part of the outer surface of this body or pin 35 projects from the periphery of sleeve 36, so that it can engage with projections 37 on gear wheel 11 which is driven from the motor in the manner already described. The rotation of gear wheel 11, driven from the motor, then causes sleeve 36, and with it the main shaft 10, of the machine, to rotate. As shaft 10 rotates, the first set of ten nails is driven in by the first stroke of the driver-beam, and at the same time the nail points are bent over by the riveting plates 26 and 26a. In order that the riveting plates 26 and 26a may be kept in a constant reciprocating motion governed by shaft 10, there are provided cams 38 and 38a which are keyed on said shaft, and which actuate bell crank levers 40 and 40a carried on a shaft 39, which in their turn actuate horizontally disposed bell crank levers 42 and 42a swinging on pivots 41 and 41a and connected to the riveting plates by articulated joints.

The driver-beam having completed its descent and the riveting plates 26 and 26a having accomplished one reciprocation, a cam 43 on the clutch sleeve 36 actuates a lever 45 which swings on a pivot 44.

Lever 45 is connected by its arm 46 and by rod 47 with an arm 49 swinging on pivot 48. This arm 49 acts as a stop for the control cam 50 of a clutch sleeve 51 mounted on shaft 52, see Fig. 7. This clutch sleeve is constructed in the same manner as sleeve 36. When the stop arm 49 moves out of the path of cam 50, sleeve 51 is brought into engagement with a revolving gear wheel 53, which is driven from motor 20, Fig. 6, through shaft 14. On shaft 52 is a bevel wheel 54, Fig. 6, which now takes the drive and in its turn drives the bevel wheel 55 on vertically disposed shaft 56, the upper extremity of which shaft engages the work table. By this means, ring 23, which as already stated, carries the work and is provided with teeth to engage with pinion 25, is caused to revolve. This partial revolution of ring 23, is continued to the extent of one sector or division of the work.

Stopping of the ring after a partial rotation is effected as follows:—

When the main shaft 10 is set in motion, the driver-beam 4 moves downward. The main shaft 10 carries a cam 57, Fig. 7, connected with the crank. At one point during the revolution of shaft 10 this cam 57 engages an arm 58 connected to handle 31 and causes handle 31 to return to the disengaged position. The purpose of this is to prevent the driver-beam from coming down again and driving fresh nails on top of those already driven, if for any reason the work table should fail to revolve. This safety device remains in action, until re-engagement is automatically effected by the means described below.

The bevel wheel 55 carries two vertically disposed pins, 59 and 60, located at diametrically opposite points on said pinion. Secured to a shaft 61, disposed in parallel alignment with these pins are a cam 62 and lever arm 63. At each semi-revolution of bevel wheel 55, one of these pins, 59 or 60, strikes the cam 62, causing both it and lever arm 63 to swing aside. The arm 63 acting through the control rod 64 connected to handle 31, causes said handle to return to the "engaged" right-hand position shown in Fig. 7. When the handle 31 is returned to this position, the hammer strikes a blow while the gear that previously had been turned one sector is in a position of rest. The second set of nails, as for instance a set of eight nails, is then driven in at the stroke No. 2. The same automatic engaging operation is repeated between the successive strokes which follow, so that in the present example on stroke three nine nails, and on stroke four another eight nails are driven in. Following stroke four, the same series of strokes, one to four is repeated. The angle between two successive strokes in the present example is 9°, so that after 40 strokes in all the work will have completed a full revolution of 360° and will be fully nailed.

At that moment the machine is automatically disengaged. This is effected through the agency of a cam 65 secured to the annular gear 23, Fig. 7, which after a complete revolution of the work table engages a bell crank lever 66, connected through rod 67 with handle 31 which is thereby brought back to the disengaged position.

Means are provided whereby the ring 23 which carries the work and normally revolves step by step, can run free when required. To this end there is provided a handle 68, Figs. 7 and 8, connected through rod 69 with a lever system 71 and 71', which swings on a pivot 70 and engages with a hub on stop arm 62. A pull on handle 68 therefore actuates the stop 62, removing it from the path of the vertical pins 59 and 60, so that the handle 31 is not carried back into the position where the driver-beam mechanism is engaged, and consequently the driver-beam remains out of action.

The connecting rod 69 also carries a collar 72, which collar when rod 69 is moved by means of the handle 68, engages the lower end of the swinging arm 46, thereby disengaging the stop 49 through the agency of rod 47, and causing shaft 52 to be clutched to the gear wheel 53. Consequently the toothed ring 23 carrying the work may revolve freely, without the driver-beam coming into action.

In order to control the nail pickers, shown diagrammatically in Fig. 10, from the driver beam, the said pickers S are mounted on parallel spindles 73 which carry worm wheels 74. These latter engage with worms 75 on a shaft 76. The step by step rotation of this shaft 76, in the present example to the extent of an angle of rotation of 90°, is accomplished through the agency of a ratchet 77 secured to said shaft, which ratchet is engaged by a pawl 78. This pawl on the downstroke of the driver-beam 4 is caused to rock by means of a rod 79 connected to the driver-beam and the cranked arm 81 mounted on shaft 76. On each downstroke of the driver-beam, the nail pickers are accordingly moved in unison to the extent of 90°.

In order that the height of the driver-beam, with respect to the work, may be varied, the connection between the driver 4 and its slides or slippers 7, 7a, instead of being permanent is adjustable. For this purpose as shown in Figs. 4, 11 and 16, the driver 4 has guide members 82 at its ends which fit between guide cheeks 7 and 7a with which the uprights 3, 3a are respectively provided. In one of these guide cheeks, say 7, is mounted a sleeve 83, which can be turned by means of a shaft 84 splined or otherwise coupled to it in such manner that the two must rotate in unison, while the sleeve may slide vertically along the shaft.

The sleeve 83 is externally threaded and carries a nut or threaded bushing 85, which is connected with guide member 82 of the driver-beam 4. When the sleeve 83 is turned by shaft 84, the nut 85 is moved and with it the driver in its guide 7, and hence the height of the driver is varied. Shaft 84 is rotated through worm gear 86 by a shaft 100 which carries an element of the worm gear, is mounted in suitable bearings 101 as shown in Fig. 11 and is provided with a pulley 96 for engagement by a belt driven by any suitable form of motor which can be reversed. At the same time, the rotation of shaft 84 also varies the height of crossbeam 27 in which the hammer sockets are carried, by placing the nut or threaded bushing 88 of the hammer socket frame 27 on the lower threaded extremity 87 of shaft 84. The effect of this will be that rotation of shaft 84 will also cause displacement of the hammer socket frame 27.

I claim:

1. The process for the nailing of wooden discs made up of two or more layers, such as the flanges of cable drums, consisting in rotating the wooden disc step by step and nailing two opposite sections thereof simultaneously during the dwell of the disc between each successive steps in the rotation thereof.

2. The process for the nailing of wooden discs made up of two or more layers such as the flanges of cable drums, consisting in rotating the wooden disc step by step and partly nailing two opposite sectors thereof simultaneously during the dwell of the disc between each successive step in the rotation thereof during 180° of said rotation and completing the nailing of each two opposite sectors simultaneously during the dwell of the disc between each successive step in the completion of a rotation thereof.

3. Apparatus for nailing work such as a wooden disc made up of several layers, comprising a revoluble work table, means for rotating the same step by step, a cross beam arranged above the work table in the diametric plane of the work thereon and provided with driver sockets, a driver beam mounted for vertical reciprocating movement, and means for imparting first a down stroke and then an upstroke to the driver beam during the periods of rest of the work table between the step by step rotations thereof.

4. Apparatus as claimed in claim 3, including riveting plates slidably mounted in the work table in the plane of the driver beam and provided with diagonal grooves, and means to impart movement thereto during the down stroke of the driver beam to bend the points of the nails driven by the driver beam.

5. Apparatus as claimed in claim 3, including riveting plates slidably mounted in the work table in the plane of the driver beam and provided with diagonal grooves and means to impart movement thereto during the down stroke of the driver beam to bend the points of the nails driven by the driver beam and comprising an actuating cam (38), and a bell crank lever (40).

6. Apparatus for nailing work such as a wooden disc made up of several layers, comprising a revoluble work table, means for rotating the same step by step, a cross beam arranged above the work table in the diametric plane of the work thereon and provided with driver sockets, a driver beam mounted for vertical reciprocating movement, means for imparting first a down stroke and then an upstroke to the driver beam during the periods of rest of the work table between the step by step rotations thereof, a lever 45, a clutch element 36 having a cam 43 to move said lever on the down stroke of the driver 4, a rod 47 articulated to said lever, a controlling arm 49 articulated to said rod and a clutch sleeve 51 controlling the step-by-step rotating means, said lever 45 when actuated by said cam being active to bring said clutch sleeve 51, through articulated rod 47 and controlling arm 49, into the coupling position for the said step-wise rotary driving means of the work table.

7. Apparatus for nailing work such as a wooden disc made up of several layers, comprising a revoluble work table, means for rotating the same step-by-step, a cross beam arranged above the work table in the diametric plane of the work thereon and provided with driver sockets, a driver beam mounted for vertical reciprocating movement, means for imparting first a down stroke and then an upstroke to the driver beam during the periods of rest of the work table between the step-by-step rotations thereof, means for the automatic reengagement of the driver mechanism after each completed step-by-step rotation of the work table, and comprising a gear wheel 55 of the driver mechanism having striker pins 59 and 60 projecting therefrom, lever mechanism actuated by said pins, a handle 31, and an articulated rod 64 by which said handle is connected to such lever mechanism, so that each time one of the pins 59 or 60 strikes a member of such lever mechanism, the latter is pushed back into the engaging position of the driver mechanism.

8. Apparatus for nailing work such as a wooden disc made up of several layers, comprising a revoluble work table, means for rotating the same step-by-step, a cross beam arranged above the work table in the diametric plane of the work thereon and provided with driver sockets, a driver beam mounted for vertical reciprocating movement, means for imparting first a down stroke and then an upstroke to the driver beam during the periods of rest of the work table between the step-by-step rotations thereof, means to render possible continued rotation of the work table while the driver beam remains out of action, comprising a gear wheel 55 having striker pins, an arm 62 movable into and out of the path of said pins, a handle 68, a system of levers 71, 71' operated by said handle to move said arm into and out of the path of said striker pins, so that when said arm is out of the path of the pins the work table revolves.

9. Apparatus for nailing work such as a wooden disc made up of several layers, comprising a revoluble work table, means for rotating the same step-by-step, a cross beam arranged above the work table in the diametric plane of the work thereon and provided with driver sockets, a driver beam mounted for vertical reciprocating movement, means for imparting first a down stroke and then an upstroke to the driver beam during the periods of rest of the work table between the step-by-step rotations thereof, means for the automatic disengaging of the step-by-step rotary drive of the work table, a ring 23 on the work table, a stop 65 on said ring, a bell crank lever 66 in the path of said stop and actuated thereby at the completion of a rotation of the work table, an engaging handle 31 to operate said disengaging means, and a rod 67 connecting said lever and said handle to cause said lever and said handle to move simultaneously.

10. Apparatus for nailing work such as a wooden disc made up of several layers, comprising a revoluble work table, means for rotating the same step-by-step, a cross beam arranged above the work table in the diametric plane of the work thereon and provided with driver sockets, a driver beam mounted for vertical reciprocating movement, means for imparting first a down stroke and then an upstroke to the driver beam during the periods of rest of the work table between the step-by-step rotations thereof, sliding shoes 7, 7a in which the driver beam is slidably mounted, vertical shafts 84, sleeves 83 mounted on said shafts for vertical movement and for rotation with said shafts, said sleeves being threadedly engaged with said sliding shoes, and nuts 85 on the driver beam, engaged by said sleeves.

11. Apparatus as claimed in claim 10, including a cross beam having driver sockets and also provided with nuts threadedly engaged by the shafts, so that the height of the said cross beam can be also adjusted.

12. In a machine of the class described, a vertically movable cross beam having driven sockets and also provided with interiorly threaded bushings, revoluble vertical shafts provided each with a threaded portion engaging the thread of said bushings, and guiding means for said cross beam, said cross beam being vertically adjusted by said vertical shafts when the latter are rotated.

HERMANN KRUSE.